United States Patent [19]
Meyn

[11] 3,886,635
[45] June 3, 1975

[54] APPARATUS FOR DRAWING A FOWL

[76] Inventor: Pieter Meyn, Noordeinde 72, Oostzann, Netherlands

[22] Filed: Nov. 13, 1973

[21] Appl. No.: 415,379

[30] Foreign Application Priority Data
Nov. 22, 1972 Netherlands.................... 7215768

[52] U.S. Cl. ................................................ 17/11
[51] Int. Cl. ........................................ A22c 21/00
[58] Field of Search ............................... 17/11, 45

[56] References Cited
UNITED STATES PATENTS

| | | | |
|---|---|---|---|
| 1,986,195 | 1/1935 | Griffin ..................................... | 17/11 |
| 2,189,752 | 2/1940 | Breitschwerdt ......................... | 17/11 |
| 3,653,093 | 4/1972 | Scheier ................................... | 17/11 |
| 3,751,761 | 8/1973 | Weiland .................................. | 17/11 |

*Primary Examiner*—Louis G. Mancene
*Assistant Examiner*—James D. Hamilton
*Attorney, Agent, or Firm*—Waters, Schwartz & Nissen

[57] ABSTRACT

An installation for continuously drawing a large number of fowls, having a plurality of drawing members adapted to be inserted in and withdrawn from a fowl suspended upside down from its ankle joints. Each drawing member comprises a linearly reciprocable bar having a pivotable extension which is aligned with said bar during the insertion of the drawing member, and which is pressed against the fowls' ribs during the withdrawal of the drawing member the extension has a blunt outer end for removing the fowl's lungs and a wedge shaped slot for catching the fowl's gullet, so that during the withdrawal of the drawing member the fowl's entrails are carried along with the extension.

13 Claims, 6 Drawing Figures

3,886,635

APPARATUS FOR DRAWING A FOWL

BACKGROUND OF THE INVENTION

The invention relates to an apparatus for drawing a fowl, comprising movable means for holding a fowl depending from a hook by the ankle joints and a drawing member having a wedge shaped slot for catching the fowl's gullet, said drawing member being adapted to be inserted into the fowl through an opening made between its breastbone and tail, until the free end of the drawing member abuts on the fowl's ribs on both sides of its spine, after which the drawing member is withdrawn from the fowl along its ribs, while pressing the fowl's back against a pressure member and carrying along the fowl's entrails connected to its gullet.

The known devices of this kind have a number of disadvantages. One of the most important disadvantage is, that the drawing member is relatively large and has a sharp outer end, so that the entrails and especially the liver of the fowl can easily be damaged during the insertion of the drawing member. During the withdrawal of the drawing member the ribs of the fowl can easily be broken by the sharp outer end of the drawing member, especially as this outer end is pressed to the ribs with a substantial force in order to ascertain the removal of the lungs.

An other important disadvantage of the known devices is that they can only be used for drawing a fowl of which the size lies between narrow limits. If a fowl is too short the sharp outer end of the drawing member tends to be pushed all the way through the fowl's body. If the fowl is to large the drawing member will not be inserted deeply enough, so that the wedge shaped slot misses the fowl's gullet and/or the outer end of the drawing member grips the fowl's ribs above the tips of the lungs instead of underneath these tips. In that case the entrails are only partially removed or even not at all.

BRIEF SUMMARY OF THE INVENTION

The invention has as its object to remove said disadvantages.

According to the invention this object is attained by means of a drawing member comprising a linearly reciprocable bar having a pivotable extension, which is aligned with said bar during the insertion of the drawing member and is pivoted towards the fowl's spine when the drawing member reaches its lowermost position, in such manner that the blunt outer end of said extension is pressed against the fowl's ribs, said drawing member cooperating with a positioning means, which brings the fowl's breastbone into the desired position relative to the drawing member during its insertion.

Advantageously said blunt outer end of said extension is formed by two balls, attached on both sides of said slot. In this manner the entrails of the fowl are not damaged during the insertion of the drawing member, whereas during the withdrawal of the drawing member the outer end thereof cannot be caught behind the ribs, so that it can be pulled back along the ribs without damaging the ribs. Because the outer end of the drawing member is blunt, it can be pushed against the ribs with a substantial force, so that the lungs are always carried along by the drawing member without pulling the lungs apart. Moreover a fowl that is too small is stretched by the drawing member during its insertion without danger that the outer end of the drawing member is pushed all the way through the fowl's body, so that even rather small fowl can be drawn with excellent results.

An important feature of the invention is, that said positioning means comprises a flap pivotably connected to said holding means gripping the fowl between its legs, said flap being normally held spaced from and over the tip of the fowl's breastbone by a counter weight, in such manner that the flap is pressed down on the breastbone during the insertion of the drawing member against the action of the counter weight, while bringing the breastbone into the right position, after which the drawing member is guided into the fowl by the flap. In this way it is assured that the drawing member is also inserted at the right distance from the fowl's breastbone. Advantageously the flap has an opening which receives the tip of the breastbone when the flap is pushed down, in such manner that the breastbone is brought into the right position relative to the flap. This has the advantage that the width of the wedge-shaped slot and therefore also the width of the drawing member can be substantially reduced, so that the entrails are less likely to be damaged.

A further important feature of the invention is that said pressure member is formed by a pivotable plate which is brought into contact with the fowl during the insertion of the drawing member as soon as the fowl's breastbone has been brought into the right position, said plate being curved in such manner, that apart from the fowl's back the plate also supports its shoulders. Because the shoulders of the fowl are also supported, a large fowl will be slightly compressed between the pressure plate and the movable holding means during the insertion of the drawing member, so that the drawing member is always inserted deeply enough in order to remove the entrails of relatively large fowl with excellent results.

Preferably, said bar comprises two mutually parallel and spaced rods between which a driving rod for displacing said extension is freely movable, the end of the bar pivotably connected to the extension being formed in such manner that said driving rod lies within the plane of said rods for at least the major part of its length in any position of the extension. In this way the drawing member is always rather thin regardless of the position of the extension, so that the entrails are even less likely to be damaged.

Under certain circumstances and especially when drawing rather small fowl it is advantageous to have a further movable holding means associated with said pressure member, which further means grip the fowl under its wings during the withdrawal of the drawing member.

BRIEF DESCRIPTION OF THE DRAWINGS

Further features and advantages of the invention will become apparent from the following description or an embodiment of the invention taken in connection with the accompanying drawings, in which.

DETAILED DESCRIPTION OF THE PREFERRED EMBODIMENT

Figure 1:
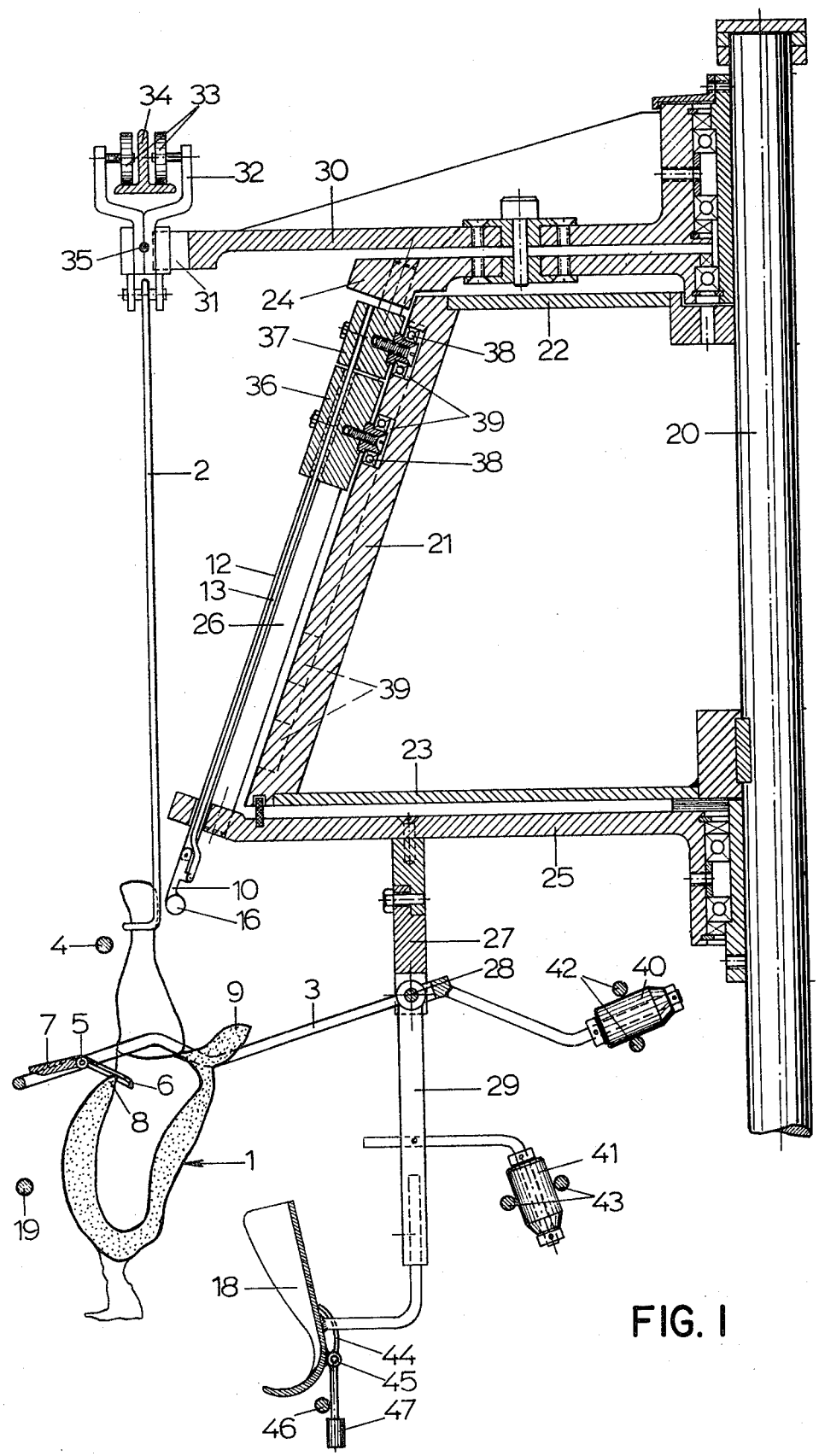
FIG. 1 is a side view, partially in cross section of the apparatus according to the invention, which shows the relative positions of the different parts of the apparatus and a fowl before the drawing member is inserted into the fowl.

The apparatus shown in the drawings serves to draw, i.e. remove the entrails including the lungs of a fowl 1, which is depending by the ankle joints from a hook 2 with its back turned towards the apparatus.

The apparatus comprises a holding means for stabilizing the fowl 1. The holding means is formed by a vertical pivotable loop-shaped clamp 3, which is pressed down between the fowl's legs in such manner that the legs are slightly stretched. When the clamp 3 is pressed down the fowl is swung slightly outwards together with the clamp. This movement of the fowl is limited by a guide 4, forming an abutment for the fowl's legs.

Figure 5:
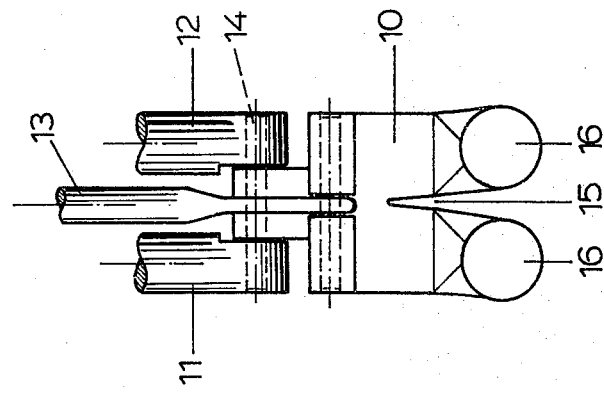
FIG. 5 is a view of the outer end of the drawing member taken along the arrow V in FIG. 3.

Near the free end of the clamp 3 is a positioning means rotatably connected with the clamp 3 by means of a pivot 5. The positioning means comprises a flap 6 having a counter weight 7. The counter weight 7 normally rests against the end of the clamp 3, so that the flap is vertically spaced from the breastbone 8 and an opening between the fowl's breastbone 8 and tail 9. The apparatus further comprises a linearly movable drawing member formed by a bar with an extension 10 pivotably connected to its outer end. As can be seen in FIG. 5, the bar comprises two parallel spaced rods 11 and 12, between which a driving rod 13 is disposed. The lower end of the driving rod 13 is pivotably connected to the extension 10 in such manner that the extension is rotated on a pivot 14 connected to the rods 11 and 12, when the driving rod 13 is moved relatively to the rods 11 and 12. The free outer end of the extension 10 has a wedge-shaped slot 15 on either side of which a ball 16 is attached to the extension 10.

When the drawing member is pushed down, the outer end of the extension 10, which then is aligned with the rods 11 and 12, abuts on the flap 6. The flap 6 is then pushed down by the drawing member against the action of the counter weight.

Figure 4:
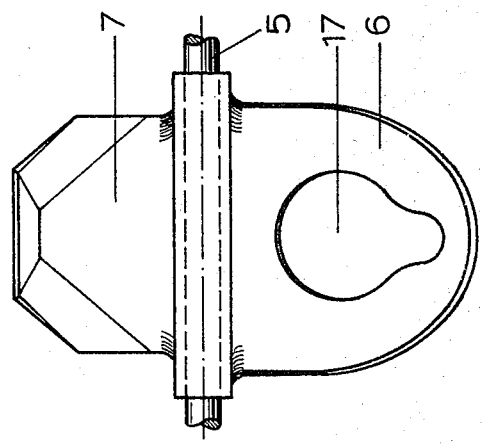
FIG. 4 is a view taken along the arrow IV in FIG. 3.
Figure 6:
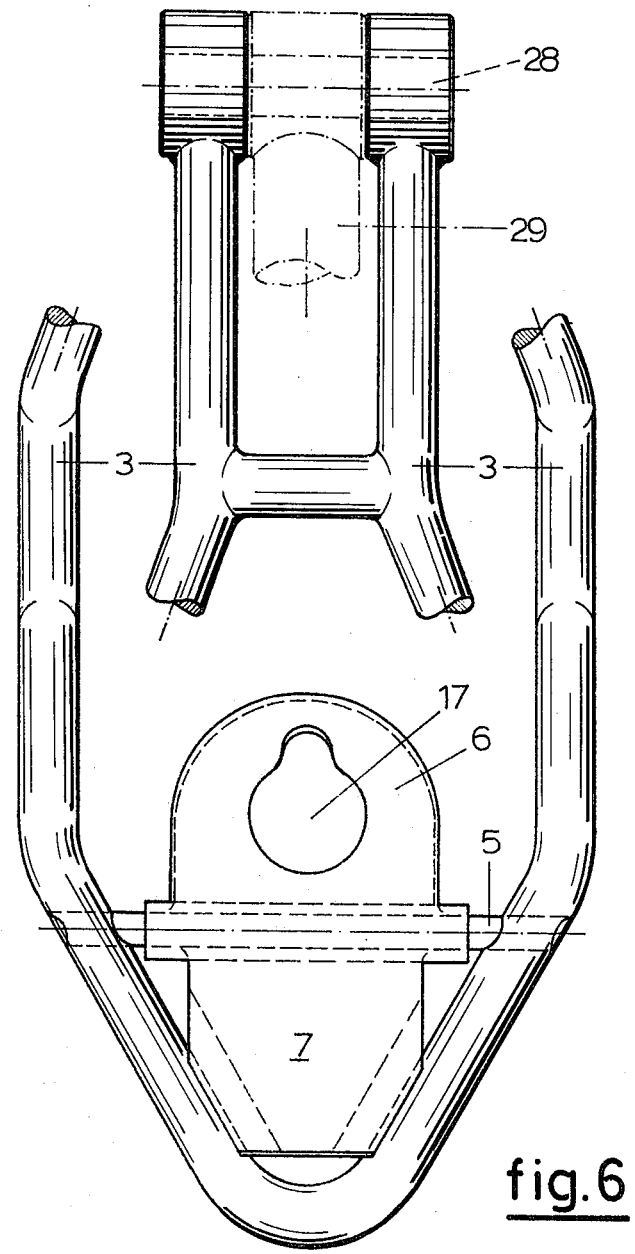
FIG. 6 is a view of the positioning means and the holding means taken along the arrow VI in FIG. 3.

During its rotation the flap 6 is pressed into the opening of the fowl, so that this opening is freed from protruding parts of the skin. At the same time the breastbone is pushed outwards, so that it is positioned at the right distance from the drawing member. Simultaneously the sharp tip of the breastbone is received in the opening 17 of the flap 6 (see FIGS. 4 and 6), so that the breastbone (and the fowl as well) is also laterally brought in the right position in which the slot 15 of the extension 10 lies directly in front of the breastbone's center. After positioning the fowl the flap 6 forms a guide for the drawing member, which now can easily be inserted into the opening of the fowl, along the inner surface of the breastbone 8.

During the insertion of the drawing member a pressure plate 18 adapted to the fowl's shape is brought up against the back of the fowl, while a guide rail 19, which forms an abutment for the breast, prevents the fowl from being pushed outwards. At the same time, the curved lower end of the pressure plate 18 is brought into contact with the fowl's shoulders. When the pressure plate 18 reaches its highest position, the drawing member is at its lowest position. A slightly too large fowl will be compressed between the lower end of the pressure plate 18 and the clamp 3, whereas a slightly too small fowl will be stretched by the blunt outer end of the drawing member, so that regardless of the fowl's size, the outer end of the drawing member will always reach the lowermost point of the fowl's body cavity, because the final distance between the outer end of the extension 10 and the lower end of the pressure plate 18 is constant.

As soon as the drawing member reaches its lowermost position, the extension 10 is pivoted towards the fowl's back. During this movement of the extension, the fowl's gullet is caught in the slot 15 and the balls 16 are pressed against the fowl's ribs on both sides of its spine and directly under its lungs, because the fowl was exactly positoned by the flap 6.

After the extension 10 has been swung down, the drawing member is pulled back, so that the fowl's gullet together with its entrails as well as its lungs are carried along by the slot 15 and the balls 16. In order to make sure that the lungs are totally removed from the fowl, the balls 16 of the extension 10 have to be pressed against the fowl's ribs with a substantial force during the withdrawal of the drawing member. Because of this the fowl's back has to be supported by the pressure plate 18 during the withdrawal of the drawing member. As the balls 16 are blunt instead of sharp the ribs of the fowl are not broken or otherwise damaged when the drawing member is pulled back.

Figure 2:
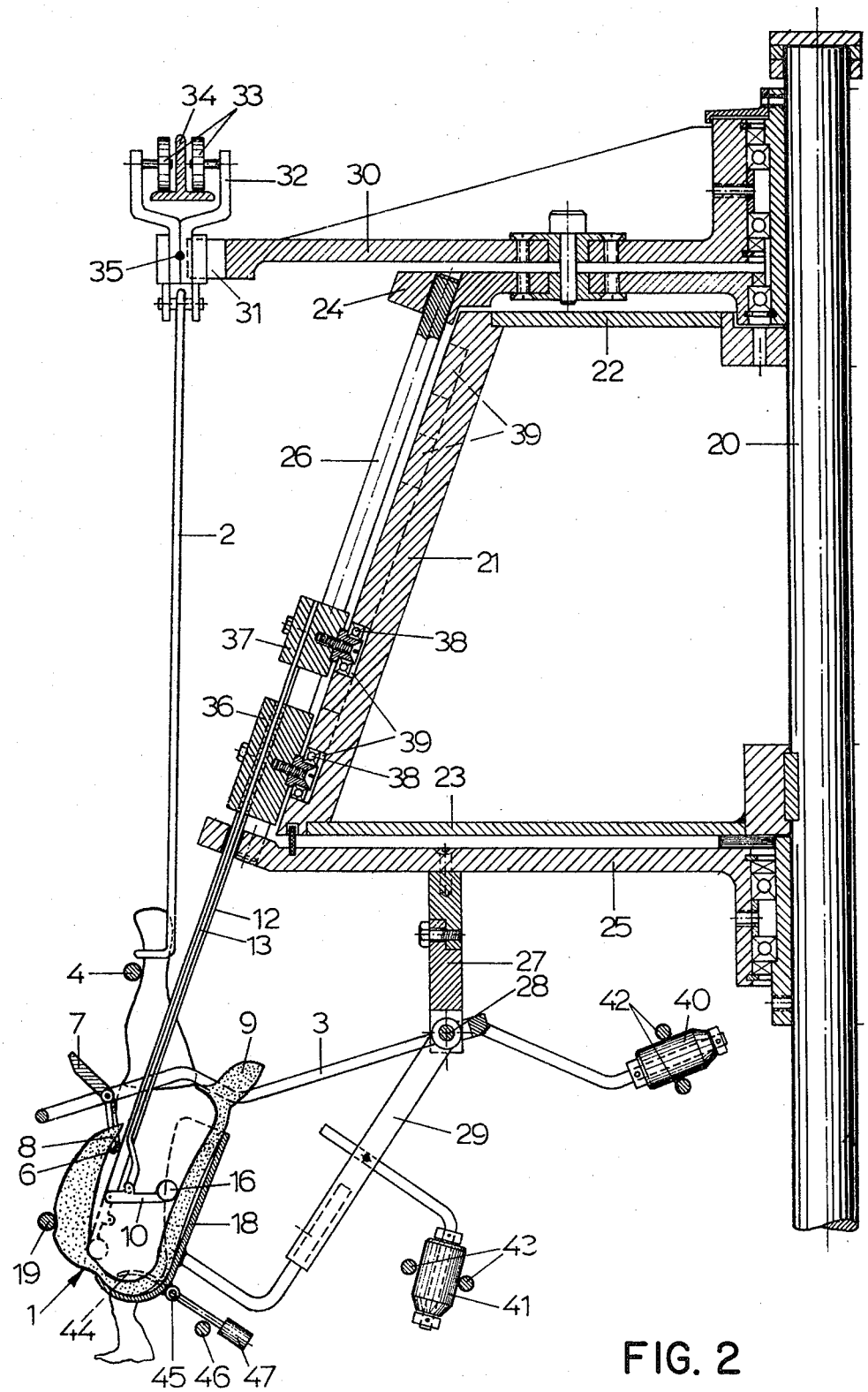
FIG. 2 is a similar side view as FIG. 1, showing the drawing member at its lowermost position.
Figure 3:
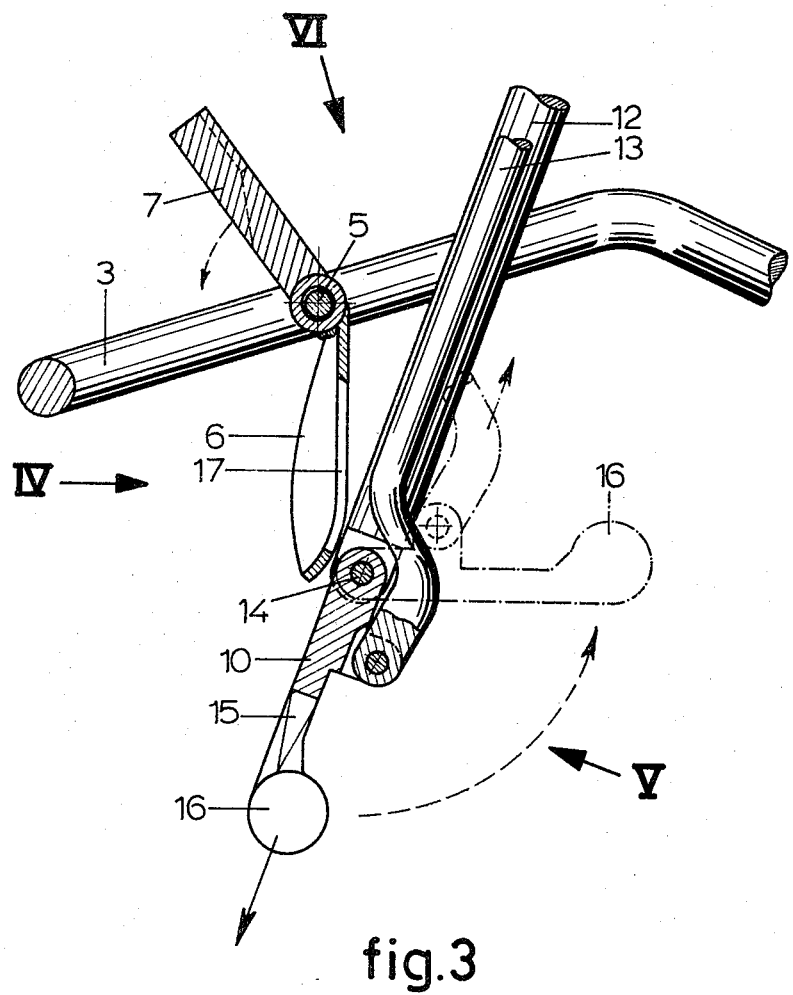
FIG. 3 is an enlarged cross sectional view of the positioning means, the outer end of the drawing member and the movable holding means of the apparatus according to the invention.

As can be seen in FIGS. 1 and 2, the driving rod 13 always lies between the rods 11 and 12, regardless of the angular position of the extension 10. Therefore, the drawing member takes up only a small space during its insertion and withdrawal, so that damage to the fowl's entrails and especially to its lungs is substantially reduced.

The apparatus shown in the drawings forms part of a revolving installation, which is able to process a large number of fowls continuously. As shown in FIGS. 1 and 2, this installation comprises a vertically disposed central shaft 20 on which a stationary cone 21 is mounted by means of two supports 22 and 23. Above the support 22 and under the support 23 radially extending circular plates 24 and 25 are rotatably mounted on the shaft 20. The plates 24 and 25 are joined together by means of guide rods 26, which are uniformly distributed in pairs over the circumferences of the plates 24 and 25. The guide rods 26 are disposed in front of the cone 21 and in parallel therewith. Centrally disposed under each pair of guide rods 26 is a vertical arm 27 attached to the underside of the plate 25. EAch arm carries a horizontal pivot pin 28 on which a clamp 3 and a supporting arm 29 for a pressure plate 18 are pivotably mounted. Above the plate 24 a horizontal driving wheel 30 is rotatably mounted on the shaft 20. The outer edge of the wheel 30 has a plurality of notches 31, disposed in such manner that a notch 31 overlies each vertical arm 27. The notches 31 are adapted to receive a hanger 32 carrying a hook 2. The hanger 32 is supported by a rail 34 by means of rollers 33. A plurality of hangers 32 are attached at uniform intervals to a pulling cable 35. Two slide blocks 36 and 37 are movably mounted on each pair of guide rods 26. The lower block 36 is attached to the rods 11 and 12 and the upper block 37 is attached to the driving rod 13. The blocks 36 and 37 each carry a follower 38 received in a camming groove 39 formed in the outer surface of the cone 21. The clamp 3 and the supporting arm 29 for the pressure plate 18 also carry a follower 40 or 41, respectively, cooperating with double guide rails 42 and 43 respectively.

During the operation of the installation, the pulling cable 35 is moving, and the hangers 32 are successively received in the notches 31 of the driving wheel 30. At the same time the legs of the fowls 1 are brought on both sides of one of the clamps 3. Because the wheel 30 is pulled along by the hangers 32, the fowls 1 are rotated around the shaft 20 together with the plates 24 and 25 which are attached to the wheel 30. Because of the rotation of the plates 24 and 25, the followers 38, 40 and 41 are displaced in their respective camming grooves 39 and along the guide rails 42 and 43. The grooves 39 and the rails 42 and 43 are formed in such manner that the clamp 3, the rods 11 and 12, the driving rod 13, the extension 10 and the pressure plate 18 perform the described actions in the right order. After the fowls have been drawn they are tangentially moved away from the installation by the hangers 32.

Under certain circumstances, for instance when drawing very small fowls, a fowl may tend to be pulled along by the drawing member during its withdrawal. In that case a U-shaped holding member 44 can be pivotally connected to each pressure plate 18 by means of a horizontal pivot 45. This holding member 44 is normally held behind the pressure plate 18 by a counter weight 47. The counter weight 47 abuts on a guide rail 46 of such shape that during the withdrawal of the drawing member the holding member 44 is rotated around its pivot 45, so that it is brought underneath the fowl's wings on both sides of the pressure plate 18, thereby preventing the fowl from being pulled along with the drawing member.

I claim:

1. Apparatus for drawing a fowl, comprising at least one movable supporting element, a hook in said supporting element for suspending a fowl by its ankle joints;

a drawing member formed as a linearly reciprocable bar having a pivotable extension provided with a wedge shaped slot for catching the fowl's gullet, and with a blunt outer end;

means for inserting said drawing member in a fowl through an opening made between its breatbone and its tail until the free end of the drawing member abuts on the fowl's ribs on both sides of its spine;

means for keeping said extension aligned with said bar during the insertion of said drawing member;

means for pivoting said extension towards the fowl's spine when said drawing member reaches its lowermost position, in such manner that said blunt outer end of said extension is pressed against the fowl's ribs;

a pressure member;

means for withdrawing said drawing member from the fowl along its ribs while pressing the fowl's back against said pressure member and carrying along the fowl's entrails connected to its gullet;

means adapted to grip between the fowl's legs and hold the same during the insertion and the withdrawal of said drawing member; and positioning means cooperating with said drawing member to bring the fowl's breastbone into the desired position relative to said drawing member during the insertion of said drawing member, and including a flap pivotably connected to said holding means, a counterweight normally holding said flap spaced from and over the tip of the fowl's breastbone, said flap being pressable down onto the said breastbone by said drawing member during its insertion against the action of said counterweight to bring the breastbone into the correct position, after which said flap serves to guide said drawing member into the fowl.

2. Apparatus according to claim 1, wherein said flap has an opening adapted to receive the tip of the breastbone when said flap is pushed down by said drawing member, in such manner that the breastbone is brought into the right position relatively to said flap.

3. Apparatus according to claim 1, wherein said pressure member is formed by a pivotable plate, which is brought into contact with the fowl during the insertion of said drawing member as soon as the fowl's breastbone has been brought into the right position, said plate being curved in such manner that apart from the fowl's back said plate also supports its shoulders.

4. Apparatus according to claim 1, wherein said bar comprises two mutually parallel and spaced rods and a driving rod for displacing said extension, said driving rod being freely movable between said first-mentioned rods and the end of said bar pivotably connected to said extension being formed in such manner that said driving rod lies within the plane of said first-mentioned rods for at least the major part of its length in any position of said extension.

5. Apparatus according to claim 1, wherein a further movable holding means is associated with said pressure member, said further means being adapted to grip the fowl under its wings during the withdrawal of said drawing member.

6. Apparatus for continuously drawing fowls, comprising a guide rail; a plurality of supporting elements slidably mounted on said guide rail; a pulling cable connected to said supporting elements for sliding said elements along said guide rail; a hook in each of said elements for suspending a fowl by its ankle joints; a vertical central shaft; a driving wheel rotatably mounted on said shaft; and provided with a plurality of notches in its circumferential edge adapted to receive the said supporting elements in such manner that said driving wheel is rotated by said pulling cable; a frame rotatably mounted on said shaft and connected to said driving wheel; a plurality of pairs of guiding rods provided in said frame; a first mounting block slidably mounted on each of the said pairs of guiding rods; a drawing member connected to each of said first mounting blocks, said drawing member being formed as a linearly reciprocable bar having a pivotable extension provided with a wedge shaped slot for catching the fowl's gullet, and with a blunt outer end; means for inserting said drawing member in a fowl through an opening made between its breastbone and its tail until the free end of the drawing member abuts on the fowl's ribs on both sides of its spine; means for keeping said extension aligned with said bar during the insertion of said drawing member;

means for pivoting said extension towards the fowl's spine when said drawing member reaches its lowermost position, in such manner that said blunt outer end of said extension is pressed against the fowl's ribs; a pressure member; means for withdrawing said drawing member from the fowl along its ribs while pressing the fowl's back against said pressure member and carrying along the fowl's entrails connected to its gullet; means cooperating with each of said drawing members and adapted to grip between the fowl's legs and hold the same during the insertion and the withdrawal of said drawing member; and positioning means cooperating with each of said drawing members to bring the fowl's breastbone into the desired position relative to said drawing member during the insertion of said drawing member.

7. Apparatus according to claim 6, wherein said blunt outer end of said extension is formed by two balls, attached on both sides of said wedge shaped slot.

8. Apparatus according to claim 6, wherein said positioning means comprises a flap pivotably connected to said holding means, and a counter weight normally holding said flap spaced from and over the tip of the fowl's breastbone, in such manner that said flap is pressed down on the breastbone by said drawing member during its insertion against the action of said counter weight to bring the breastbone into the right position, after which said drawing member is guided into the fowl by said flap.

9. Apparatus according to claim 6, wherein said flap has an opening adapted to receive the tip of the breastbone when said flap is pushed down by said drawing member, in such manner that the breastbone is brought into the right position relatively to said flap.

10. Apparatus according to claim 6, wherein said pressure member is formed by a pivotable plate, which is brought into contact with the fowl during the insertion of said drawing member as soon as the fowl's breastbone has been brought into the right position, said plate being curved in such manner that apart from the fowl's back said plate also supports its shoulders.

11. Apparatus according to claim 6, wherein a second mounting block is slidably mounted on each of the said pairs of guiding rods; and each of said bars comprises two mutually parallel and spaced rods having their upper ends connected to said first mounting block and their lower ends pivotably connected to said extension; and a driving rod having its lower end pivotably connected to said extension and its upper end connected to said second mounting block; said driving rod being adapted to displace said extension and being freely movable between said rods and the end of said bar pivotably connected to said extension being formed in such manner that said driving rod lies within the plane of said first-mentioned rods for at least the major part of its length in any position of said extension.

12. Apparatus according to claim 11, wherein a cone shaped camming member is mounted on said central shaft, said camming member having a first and a second camming groove in its outer surface, and said first and second mounting blocks each carrying a follower received in said first and second camming grooves respectively, in such manner that during the rotation of said frame around said camming member said mounting blocks are moved up and down on said guiding rods.

13. Apparatus according to claim 6, wherein a further movable holding means is associated with each of said pressure members, said further means being adapted to grip the fowl under its wings during the withdrawal of said drawing member.

* * * * *